United States Patent
Sachse et al.

(10) Patent No.: US 7,180,960 B2
(45) Date of Patent: Feb. 20, 2007

(54) PHASE ERROR CORRECTOR AND METHOD

(75) Inventors: Eric Sachse, Dresden (DE); Menno Mennenga, Dresden (DE); Thomas Hanusch, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 814 days.

(21) Appl. No.: 10/327,165

(22) Filed: Dec. 20, 2002

(65) Prior Publication Data

US 2004/0062322 A1    Apr. 1, 2004

(30) Foreign Application Priority Data

Sep. 30, 2002   (DE) ................ 102 45 686

(51) Int. Cl.
  *H04L 27/20* (2006.01)
(52) U.S. Cl. ...................... 375/308; 375/279
(58) Field of Classification Search ........ 375/279–280, 375/284, 329, 331, 344, 308; 327/231, 237, 327/238, 243; 370/350; 329/304, 306–310
See application file for complete search history.

(56) References Cited

U.S. PATENT DOCUMENTS

| | | | | |
|---|---|---|---|---|
| 4,608,540 A | * | 8/1986 | Tsuchiya et al. | 329/306 |
| 4,989,220 A | * | 1/1991 | Serrone | 375/329 |
| 5,440,267 A | * | 8/1995 | Tsuda et al. | 329/308 |
| 5,533,060 A | * | 7/1996 | Kameo et al. | 375/332 |
| 5,550,506 A | * | 8/1996 | Tsumura | 329/304 |
| 6,396,803 B2 | | 5/2002 | Hornsby et al. | |
| 6,873,663 B1 | * | 3/2005 | Shipton | 375/329 |
| 6,895,045 B2 | * | 5/2005 | Ozluturk | 375/235 |
| 7,020,225 B2 | * | 3/2006 | Sindhushayana et al. | 375/344 |
| 2002/0034266 A1 | | 3/2002 | Akahori | |

FOREIGN PATENT DOCUMENTS

EP    0762700    3/1997

* cited by examiner

*Primary Examiner*—Khanh Tran
(74) *Attorney, Agent, or Firm*—Meyertons Hood Kivlin Kowert & Goetzel, P.C.; B. Noël Kivlin

(57) ABSTRACT

A phase error corrector circuit and method are disclosed. In one embodiment, a phase error corrector circuit delays a PSK modulated signal and multiplies the delayed PSK modulated signal by the PSK modulated signal in order to generate a forward phase correction signal. The input signal is then mixed with the forward phase correction signal. In another embodiment, a phase error corrector circuit calculates a forward phase offset of a complex PSK modulated signal. The complex PSK modulated signal is phase shifted in a mixer by a phase difference offset in order to generate a phase corrected signal. A backward phase correction means calculates a backward phase offset based on the phase corrected signal. A subtractor subtracts the forward phase offset from the backward phase offset for outputting a difference phase offset to the mixer.

56 Claims, 1 Drawing Sheet

PHASE ERROR CORRECTOR AND METHOD

FIELD OF THE PRESENT INVENTION

The present invention relates to the field of phase modulated digital signals and particularly to recovery of digital data from phase shift keying (PSK) modulated signals.

DESCRIPTION OF THE PRIOR ART

Phase correction of incoming digital signals is performed through various methods including Costas, loops and other phase locked loops (PLL). Nearly all these methods generate a radio frequency (RF) signal with a voltage controlled oscillator (VCO). A phase comparator compares the VCO generated RF signal with a RF input signal and generates a VCO voltage having a monotone dependence on the phase difference between the VCO generated RF signal and the RF input signal. The VCO control voltage is input into the VCO and changes the phase and frequency of the RF signal generated by the VCO. Thereby the phase error is reduced and completely disappears under ideal circumstances. The output of the phase comparator is low-pass filtered or integrated before it is input into the VCO.

Since the phases of the RF input signal and the VCO generated RF signal in general have a constant phase difference, the frequencies of these signals are also identical. As a consequence, it can be said that the phase locked loop locks the frequency and phase of the VCO generated RF signal with the frequency and phase of the RF input signal. The phase comparator of the PLL generates an output voltage approximately proportional to the phase error.

This process is the basis of the Costas loop, the "XN" loop and the re-modulator loop. The frequency and phase of phase demodulators which incorporate phase lock loops must be adjusted to match the frequency and phase of the input signal before demodulation can occur. Due to the low-pass filtering or integration of the signal output by the phase comparator, relatively long periods of time are required to acquire the phase of the input carrier signal.

Time delays resulting from phase locked loop phase demodulators create various problems with signals transmitted in short bursts e.g., time domain multiple access (TDMA) signals. Unless the phase error is removed quickly, information within short bursts signals may be lost over a long acquisition time. A delay in the synchronization of the PLL with the RF input signal creates high overhead on the system level due to long preambles before pay-load data to enable phase acquisition. Similar receiving systems require easy adjustment of reception of varying signal types e.g., binary PSK (BPSK), quaternary PSK (QPSK) and eightary PSK (8PSK) or varying data rates. Phase correctors which utilise RF processing schemes require RF bandwidth and/or special harmonic generator circuits which can be cumbersome to adjust. Baseband processors, however, incorporate low-pass filters which are easy to adjust.

FIG. 2 illustrates BPSK. The phase of a radio frequency signal rotates in the complex plane with the radio frequency. If the RF signal is modulated by PSK, the phase additionally jumps from time to time forward and backward. After mixing the RF signal with the RF frequency and low-pass filtering, that is, transferring the RF signal to baseband, the phase does not rotate anymore but rather assumes only two states in the complex plane in the case of BPSK. The distance between the origin and the states is portional to the amplitude of the received signal, but has been normalized to 1 in FIG. 2. As a consequence, the phase states are in general to be found on the unit circle. The position on the unit circle depends on the phase difference between the received RF signal and the VCO frequency and the original phases used for modulation. This phase difference has been chosen so that the states are to be found on the x axis in FIG. 2.

FIG. 3 illustrates the baseband signal of QPSK in diamond constellation. When using QPSK, the RF signal is modulated with four phase states. After transformation to a baseband, and provided that the phase difference between the RF signal and the VCO frequency has an appropriate value, the phase states in baseband assume a diamond constellation as shown in FIG. 3.

In U.S. Pat. No. 4,943,982, a phase corrector is disclosed which inputs in-phase and quadrature signals at baseband. These signals are generated by a demodulator which is similar to a Costas loop. The demodulator inputs an RF or intermediate frequency (IF) signal. The RF or IF signal is multiplied by the output of a VCO in a first multiplier. The output of the multiplier is low-pass filtered in order to form the in-phase baseband signal. A second multiplier multiplies the output of the VCO shifted by 90° with the RF or IF signal. The output signal of the second multiplier is also low-pass filtered in order to form the quadrature baseband signal. Within the phase corrector, the in-phase and quadrature components are multiplied in a first complex multiplier by a conjugated average phase error, which is a complex signal having an in-phase and a quadrature component, thereby generating an in-phase and quadrature phase adjusted baseband signals. The output of said first complex multiplier is input into a symbol decision circuit which compares the phase adjusted baseband signals with an allowable set of symbols and generates an estimated ideal signal. The estimated in-phase and quadrature components of the ideal signal is conjugated in a first conjugator and relayed to a second complex multiplier. The conjugated ideal signal is multiplied with the in-phase and quadrature baseband signals from the demodulator. The in-phase and quadrature components of the product output from the second multiplier is averaged in two low-pass filters to form an average phase error. The average phase error is input into a second conjugator in order to create the conjugated average phase error, which is input into the first complex multiplier.

Conventional phase correctors (PEC) are designed to compensate for a static or slow varying phase-offset. To be stable against noise and distortions, they always need to average over a certain number of phase-estimates to filter out those variations. This low-pass filter employs a system specific delay of the averaged phase estimates against the actual incoming signal to be phase corrected. If the phase variations are slow enough, this effect does not matter, but for quicker phase variations a residual phase-offset remains even after correction. In a following coherent decoding/demodulation part of the receive, this residual offset causes performance degradation.

First stage frequency offset correctors (FEC) mostly do only a course compensation. Nevertheless, a residual frequency offset remains. A frequency-offset distortion can be viewed as a constantly changing phase-drift because the phase difference between input signal and VCO signal rotates in the complex plane with the frequency offset. This phase-drift causes a constant phase estimation error in the PEC. This error depends equally on the frequency-offset value and the group delay of the PEC's low-pass filter. This results in a performance degradation.

Although different circuits and methods are known in the art to speed up the acquisition time of phase locked loops and to reduce frequency-offsets, it is desirable to compensate for the residual frequency offset and the actual phase offset.

SUMMARY OF THE INVENTION

According to one embodiment a phase error corrector comprises an input for receiving a complex PSK modulated signal. It further comprises a delay means which is connected to the input for delaying the complex PSK modulated signal in order to generate a first delayed signal. The phase error corrector additionally comprises a multiplier which is connected to the input and the delay means for multiplying the first delay signal by the complex PSK modulated signal to generate a forward phase correction signal. The phase error corrector finally comprises a mixer which is connected to the input for multiplying the complex PSK modulated signal by a phase correction signal that is generated based on the forward phase correction signal.

According to another embodiment a phase error correction method is provided which comprises delaying a complex PSK modulated signal, thereby generating a first delayed signal and multiplying the first delayed signal by the complex PSK modulated signal in order to generate a forward phase correction signal. The phase error correction method further comprises multiplying the complex PSK modulated signal by a phase correction signal that is generated based on the forward phase correction signal.

According to yet another embodiment a phase error corrector is provided which comprises an input for receiving a complex PSK modulated signal and a forward phase correction circuit connected to the input for calculating a forward phase offset. The phase error corrector further comprises a backward phase correction means for calculating a backward phase offset and a subtractor connected to the forward phase correction means and the backward phase correction means for subtracting the forward phase offset from the backward phase offset in order to calculate a difference phase offset. The phase error corrector finally comprises a mixer connected to the input for shifting the phase of the complex PSK modulated signal approximately by the difference phase offset.

According to a further embodiment a phase error correction method is provided which comprises calculating a forward phase offset of a complex PSK modulated signal and calculating a backward phase offset based on a phase corrected signal. The method further comprises subtracting the forward phase offset from the backward phase offset in order to calculate a difference phase offset. The method finally comprises shifting the phase of the complex PSK modulated signal approximately by the difference phase offset thereby generating the phase corrected signal.

BRIEF DESCRIPTION OF THE DRAWINGS

Further embodiments, advantages and objects of the present invention are defined in the appended claims and will become more apparent with the following detailed description when taken with reference to the accompanying drawings in which:

DETAILED DESCRIPTION OF THE INVENTION

Figure 1:
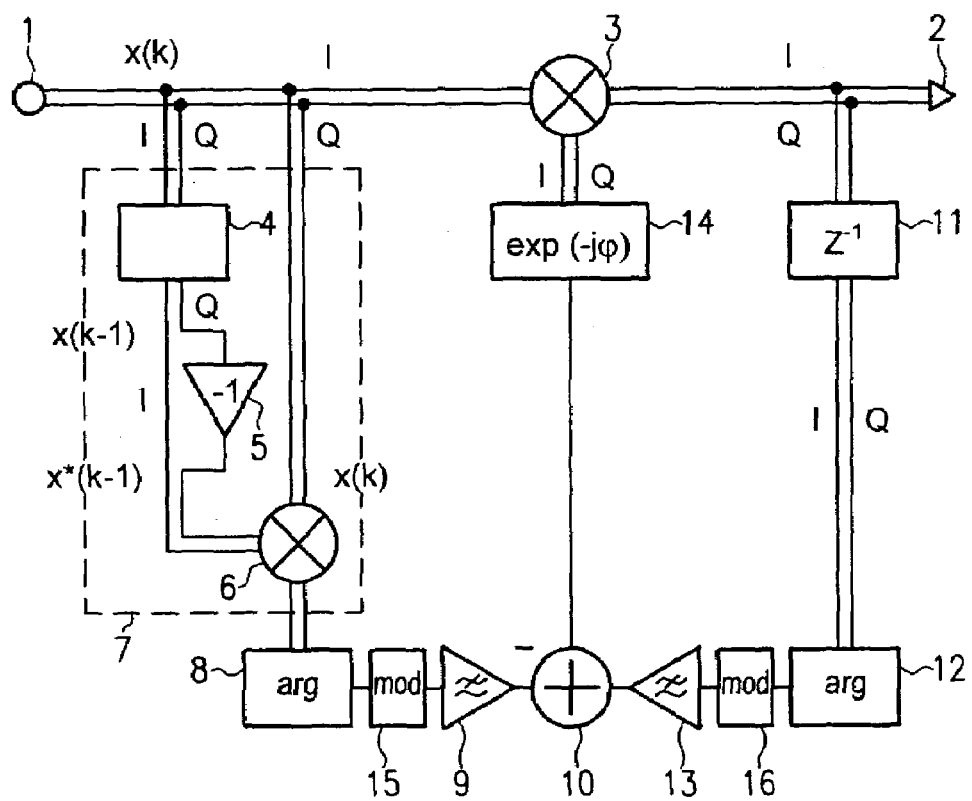
FIG. 1 shows a phase error corrector circuit.

While the present invention is described with reference to the embodiments as illustrated in the following detailed description as well as in the drawings, it should be understood that the following detailed description as well as the drawings are not intended to limit the present invention to the particular illustrative embodiments disclosed, but rather the described illustrative embodiments merely exemplify the various aspects of the present invention, the scope of which is defined by the appended claims.

As previously explained, a phase error corrector circuit delays a PSK modulated signal and multiplies the delayed PSK modulated signal by the PSK modulated signal in order to generate a forward phase correction signal. The input signal is then mixed with the forward phase correction signal.

As previously explained, according to another embodiment a phase error corrector circuit calculates a forward phase offset of a complex PSK modulated signal. The complex PSK modulated signal is phase shifted in a mixer by a phase difference offset in order to generate a phase corrected signal. A backward phase correction means calculates a backward phase offset based on the phase corrected signal. A subtractor subtracts the forward phase offset from the backward phase offset for outputting the difference phase offset. The latter embodiment advantageously compensates for the residual frequency offset and the actual phase offset in one block. This raises the system performance in the presence of frequency offset distortions. Furthermore, only a single mixer equivalent to a multiplier in the complex data path is required.

FIG. 1 illustrates an embodiment in detail. It comprises an input 1, and output 2, a mixer 3, a differential complex multiplier 7 a delay 11, two angle modules 8 and 12, two modular modules 15 and 16 and two low-pass filters 9 and 13, a subtractor 10 and a complex number generator 14. The differential complex multiplier 7 comprises a delay unit 4, an inverter 5 and a complex multiplier 6.

In FIG. 1 complex signals are illustrated by two parallel lines. One is designated I for in-phase component and the other one is designated Q for quadrature component.

At input 1 in general a nPSK modulated baseband converted signal is received which may suffer from both, a residual frequency offset and an actual phase offset. Typical values for n are 2 also designated BPSK, 4, also designated QPSK and 8.

The inputted complex PSK signal x(k) is provided to both a delay 4 and a mixer 3. x(k) designates a symbol equivalent to a phase state at the time k. The delay 4 delays the input PSK modulated signal by one symbol length so that the output of delay 4 provides the previous symbol equivalent to the previous phase state x(k−1). The quadrature component of the delayed PSK modulated signal is inverted in inverter 5, thereby generating a conjugated delayed PSK modulated signal x*(k−1), which is input into complex multiplier 6. The complex multiplier 6 multiplies the delayed conjugated PSK modulated signal by the complex PSK modulated signal in order to generate a forward phase correction signal.

The forward phase correction signal is a complex signal which has a in-phase and quadrature component. It is input into the first angle module 8. The phase or argument of a complex signal can be calculated according to the following equations 1 and 2:

$$\varphi_f = \arctan\left(\frac{\text{quadrature component}}{\text{in-phase component}}\right); \text{ for in-phase component} \geq 0 \quad (1)$$

$$\varphi_f = \arctan\left(\frac{\text{quadrature component}}{\text{in-phase component}}\right) + \pi; \text{ for in-phase component} < 0 \quad (2)$$

A phase difference of n2π is never significant, since the angle functions are periodic with 2π. However, in the specific case of BPSK, the phase difference between two symbols is either zero or π in the ideal case. As a consequence, if the absolute value of the phase difference between two BPSK symbols is smaller than π/2, it is assumed that both symbols are the same. If this absolute value is bigger than π/2, it is assumed that the two symbols are different. In the latter case, a phase difference of π is expected between the two symbols in the ideal case. So π may be added to or subtracted from the phase difference so that its value lies within the interval ranging from –π/2 to π/2.

The modulo module 15 illustrates this adding or subtracting operation. The signal output by the first modulo module 15 is referred to as a limited forward phase offset. In the case of BPSK, the modulo module 15 can also be implemented simply by ignoring the sign of the in-phase component. That is to say the modulo module can be replaced by absolute value circuit for the in-phase component between multiplier 6 and angle module 8. If the symbol values are 1 and –1 for BPSK in the complex plane, a removal of the sign of the in-phase component removes the data information from the received symbols but maintains the phase error information.

The above considerations are worst case scenarios. In real implementations it must be made sure that the phase error is below π/4 in most of the cases. Otherwise the bit error rate will increase to unacceptable high values. As a consequence, it is acceptable to approximate the arctan function by a linear function having a slope of 1 and crossing the origin. This is a first order approximation of the power series of the arctan function:

$$\arctan(x) = x - \frac{x^3}{3} + \frac{x^5}{5} - \ldots \quad (3)$$

Figures 2, 3, 4:
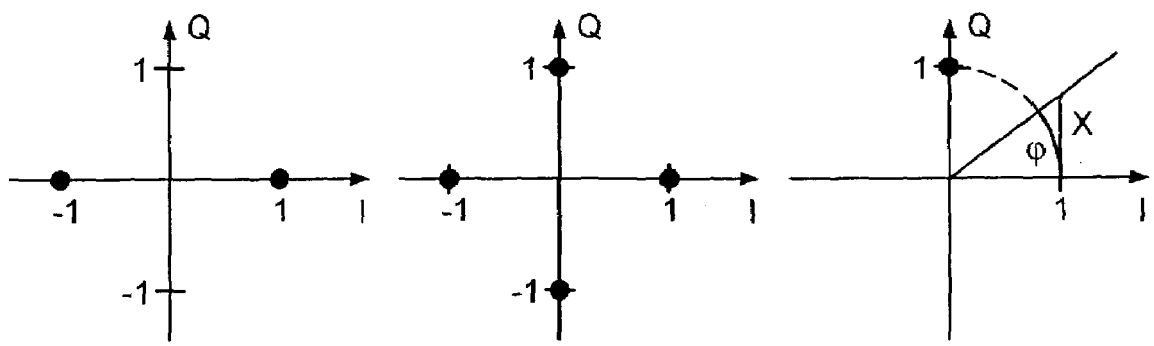
FIG. 2 illustrates the phases used for BPSK.
FIG. 3 illustrates the phases used for QPSK in diamond constellation.
FIG. 4 illustrates the approximation of an arctan function by a linear function.

The approximation of an arctan function is illustrated in FIG. 4. The arc designated φ on the unit circle illustrates the exact value of the phase whereas the straight line designated x is the value obtained by a linear function having a slope of 1. In general it is of less importance that the phase is calculated correctly. Rather the control variable being the phase difference or a linear approximation thereof in this case should have a value of 0 if the phase is perfectly adjusted i.e. coherence has been reached and should at least indicate the tendency of the necessary adjustment to reach coherency if the deviation from coherency is still big. This is a further reason why a linear approximation of the arctan function is acceptable.

Similar considerations can be made for QPSK modulation. In this case, the phase difference between ideal symbols is π/2. Hence, only a phase difference of π/4 between symbols is significant. That means if the absolute value of the phase difference is below π/4, it is assumed that both symbols are the same. If the phase difference is between π/4 and 3π/4, it is assumed that the phase difference between the two symbols is π/2 and so on. In practice, the system design must ensure that the phase differences are below π/8 in most of the cases. Otherwise, the bit error rate will become too high as indicated above.

In the case of a QPSK modulation, the modulo module 15 may be replaced by two absolute value circuits for each, the in phase and quadrature component of the forward phase correction signal output by complex multiplier 6. In the case of QPSK, a removal of the signs of the in-phase and quadrature components removes the data information and preserves the phase error information.

In this case, the phase signal output from angle module 8 is within the interval ranging from zero to π/2. This range is shifted with respect to the above interval from –π/4 to π/4. This is acceptable since the following circuit components, namely low-pass filter 9 and subtractor 10, are linear. This solution is inferior since the approximation of the arctan function by a linear function is better in the interval ranging from –π/4 to π/4 than in the interval from zero to π/2. However, in any case, the approximation is not worse compared to BPSK.

In the more general case of an nPSK modulation, the modulo module adds two or subtracts from the phase calculated in the angle module 8 values of 2π/n in order to insure that the forward phase of said ranges from –π/n to π/n.

The type and the strength of filtering of the low-pass filter 9 depend on the expected signal to noise ratio and the system application. Instead of a low-pass filter, an averaging can be used. In an analog implementation, low-pass filters are preferred, whereas in a digital implementation an averaging filter is preferred.

The phase corrected signal output by the mixer 3 is provided to output 2 of the phase error corrector circuit and to delay 11. Delay 11 outputs a delayed phase corrected signal to the second angle module 12. The delay 11 generates the minimum loop delay required of feedback of the datapath signal. The second angle module operates in a similar manner as the first angle module 8 and specifically calculates the phase of complex delayed phase corrected signal. The latter phase is referred to as backward phase offset.

The backward phase offset is provided to a second modulo module 16 which outputs a limited backward phase offset. The second modulo module is implemented in a similar fashion as the first modulo module and limits the phase to a value in the interval ranging from –π/n to π/n for a nPSK modulated signal. Like the first modulo module 15, it can be implemented as an absolute value circuit removing the sign of the in-phase component of the delayed phase corrected signal for BPSK. It can also be implemented as two absolute value circuits removing the sign of both, the in-phase and quadrature components of the delayed phase corrected signal for QPSK. In this case, the backward phase offset is within the interval ranging from zero to π/2 which is not centered around zero. Since the first modular module 15 is implemented in a similar fashion as the second modulo module 16, both the forward phase offset and the backward phase offset are within the same range, and a shift of both ranges is cancelled in subtractor 10.

The limited backward phase offset is low-pass filtered in the second low-pass filter 13, which is implemented in a similar fashion as low-pass filter 9. In particular, it can be replaced by an averaging filter.

Subtractor 10 subtracts the output of the first low-pass filter 9 from the output of the second low-pass filter 13 and thereby generates a difference phase offset. The difference phase offset is input into complex number generator 14. The complex number generator transforms the phase signal into a complex signal, referred to as phase correction signal, having an in-phase and a quadrature component. The phase correction signal has a norm of 1 independent of the difference phase offset. The mixer 3 finally multiplies the input PSK modulated signal by the phase correction signal in order to generate the phase corrected signal.

The phase error corrector as shown in FIG. 1 can be implemented both in hardware and in software.

The two low-pass or averaging filters 9 and 13 can be replaced by a single low-pass or averaging filter, which is allocated between subtractor 10 and complex number generator 14 in order to low-pass filter or average the difference phase offset.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments.

The invention claimed is:

1. A phase error corrector comprising:
an input (1) for receiving a complex PSK modulated signal (x(k));
a delay means (4) connected to said input for delaying said complex PSK modulated signal for generating a first delayed signal (x(k−1));
a multiplier (6) connected to said input (1) and said delay means (4) for multiplying said first delayed signal by said complex PSK modulated signal (x(k)) to generate a forward phase correction signal;
a mixer (3) connected to said input for multiplying said complex PSK modulated signal (x(k)) by a phase correction signal which is generated based on said forward phase correction signal for generating a phase corrected signal;
a first angle module (8) connected to said multiplier (6) for receiving said forward phase correction signal, said first angle module (8) calculating a forward phase offset which constitutes the phase of said complex forward phase correction signal; and
a second angle module (12) and a subtractor (10), said second angle module being connected to an output of said mixer (3) for generating a backward phase offset constituting the phase of said phase corrected signal; said subtractor (10) being connected to said first angle module (8) and said second angle module (12) for subtracting said forward phase offset from said backward offset thereby calculating a difference phase offset; said phase correction signal being connected based on said difference phase offset.

2. The phase error corrector of claim 1, wherein said first angle module (8) approximates an arctan function by a linear function with a slope of 1.

3. The phase error corrector of claim 1, wherein a complex nPSK modulated signal is received at said input (1) and said phase error corrector further comprising a first modulo module (15) being connected to said first angle module (8) for receiving said forward phase offset for adding or subtracting 2 π/n to or from said forward phase offset in order to generate a limited forward phase offset being within an interval ranging from −π/n to π/n.

4. The phase error corrector of claim 1, further comprising a first low-pass filter (9) for low-pass filtering said forward phase correction signal and providing said low-pass filtered forward phase correction signal to said mixer (3).

5. The phase error corrector of claim 1, further comprising a first average filter (9) for averaging said forward phase correction signal and providing said averaged forward phase correction signal to said mixer (3).

6. The phase error corrector of claim 1, wherein said second angle module approximates an arctan function for calculating said backward phase offset by a linear function having a slope of 1.

7. The phase error corrector of claim 1, further comprising delay means (11) connected to an output of said mixer (3) for receiving said phase corrected signal and generating a delayed phase corrected signal; an output of said delay means (11) being connected to an input of said second angle module (12) for providing said delayed phase corrected signal to said second angle module (12).

8. The phase error corrector of claim 1, wherein said input (1) receives a complex nPSK modulated signal and said phase error corrector further comprising a second modulo module (16) connected to said second angle module (12) for receiving said backward phase offset and connected to said subtractor (10) for providing a limited backward phase offset to said subtractor (10); said second modulo module (16) adding or subtracting 2π/n to or from said backward phase offset so that said limited backward phase offset is within an interval ranging from −π/n to π/n.

9. The phase error corrector of claim 1, further comprising a second low-pass filter (13) connected to said second angle module (12) for receiving said backward phase offset and being connected to said subtractor (10) for providing a low-pass filtered backward phase offset to said subtractor (10).

10. The phase error corrector of claim 1, further comprising a second average filter (13) being connected to said second angle module (12) for receiving a backward phase offset and being connected to said subtractor (10) for providing an averaged backward phase offset to said subtractor (10).

11. The phase error corrector of claim 1, further comprising a complex number generator (14) connected to said subtractor (10) for receiving said difference phase offset and being connected to said mixer (3) for providing said complex phase correction signal to said mixer (3), said phase correction signal comprising an in-phase component (1) and a quadrature component (Q) and the phase of said phase correction signal being equivalent to said difference phase offset.

12. The phase error corrector of claim 1 further comprising an inverter (5) for receiving a quadrature component (Q) of said first delayed signal (x(k−1)) thereby generating a conjugated first delayed signal (x*(k−1)) and providing said conjugated first delayed signal to said multiplier (6).

13. The phase error corrector of claim 1, wherein said delay means (4) delays said complex PSK modulated signal (x(k)) by the duration of one symbol.

14. A phase error correction method comprising:
delaying (4) said complex PSK modulated signal (x(k)) for generating a first delayed signal (x(k−1));
multiplying (6) said first delayed signal by said complex PSK modulated signal (x(k)) to generate a forward phase correction signal;
multiplying said complex PSK modulated signal (x(k)) by a phase correction signal being generated based on said forward phase correction signal thereby generating a phase corrected signal in a mixer (3);
calculating a forward phase offset which constitutes the phase of said complex forward phase correction signal: and generating a backward phase offset constituting the phase of said complex phase corrected signal and subtracting said forward phase offset from said backward phase offset thereby calculating a difference phase offset and generating said phase correction signal based on said difference phase offset.

15. The method of claim 14 wherein an arctan function for calculating the phase of said complex forward phase correction signal is approximated by a linear function with a slope of 1.

16. The method of claim 14, wherein a complex nPSK modulated signal is received at said input (1) and $2\pi/n$ is added to or subtracted from said forward phase offset in order to obtain a limited forward phase offset which is within an interval ranging from $-\pi/n$ to $\pi/n$.

17. The method of claim 14, further comprising low-path filtering of said forward phase correction signal in order to obtain a low-pass filtered forward phase correction signal and providing said low-pass filtered forward phase correction signal to said mixer (3).

18. The method of claim 14, further comprising averaging said forward phase correction signal in order to obtain an averaged forward phase correction signal and providing said averaged forward phase correction signal to said mixer (3).

19. The method of claim 14, wherein an arctan function for calculating the backward phase offset is approximated by a linear function having a slope of 1.

20. The method of claim 14, further comprising delaying said phase corrected signal thereby generating a delayed phase corrected signal before the backward phase offset is calculated based on the delayed phase corrected signal.

21. The method of claim 14, wherein a complex nPSK modulated signal (x(k)) is delayed for generating said first delayed signal further comprising adding or subtracting (16) $2\pi/n$ to or from said backward phase offset in order to calculate a limited backward phase offset which is within an interval ranging from $-\pi/n$ to $\pi/n$.

22. The method of claim 14, further comprising low path filtering of said backward phase offset in order to generate a low-pass filtered backward phase offset and subtracting said forward phase offset from said low-pass filtered backward phase offset in order to calculate said difference phase offset.

23. The method of claim 14, further comprising averaging (13) said backward phase offset in order to generate an averaged backward phase offset and subtracting said forward phase offset from said averaged backward phase offset in order to generate said difference phase offset.

24. The method of claim 14, wherein said complex phase correction signal is generated based on said difference phase offset wherein the phase of said phase correction signal is equivalent to said difference phase offset.

25. The method of claim 14, further comprising inverting a quadrature component (Q) of said first delayed signal (x(k−1)) in order to generate a conjugated first delayed signal (x*(k−1)) which is multiplied by said complex PSK modulated signal (x(k)) in said multiplying step.

26. The method of claim 14, wherein said complex PSK modulated signal (x(k)) is delayed by the duration of one symbol.

27. A phase error corrector comprising;
an input for receiving a complex PSK modulated signal (x(k));
a forward phase correction means (7, 8, 15) connected to said input for calculating a forward phase offset based on a phase corrected signal;
a backward phase correction means (11, 12, 16) for calculating a backward phase offset;
a subtractor (10) connected to said forward phase correction means (7, 8, 15) and said backward phase correction means (11,12, 16) for subtracting said forward phase offset from said backward phase offset and for outputting a difference phase offset;
a mixer (3) connected to said input (1) for shifting the phase of said complex PSK modulated signal (x(k)) approximately by said difference phase offset in order to generate a phase corrected signal; and
a complex number generator (14) connected to said subtractor (10) for receiving said difference phase offset and being connected to said mixer (3) for providing said complex phase correction signal to said mixer (3), said phase correction signal comprising an in-phase component (1) and a quadrature component (Q) and the phase of said phase correction signal being equivalent to said difference phase offset.

28. The phase error corrector of claim 27, said forward phase correction means comprising a first angle module (8) for calculating said forward phase offset based on a complex forward phase correction signal which comprises an in-phase and quadrature component.

29. The phase error corrector of claim 28, wherein said first angle module (8) approximates an arctan function by a linear function with a slope of 1.

30. The phase error corrector of claim 27, said forward phase correction means comprising a delay means (4) and a complex multiplier (6); said delay means being connected to said input (1) for delaying said complex PSK modulated signal (x(k)) for generating a first delayed signal (x(k−1)); said complex multiplier (6) being connected to said input (1) and said delay means (4) for multiplying said first delayed signal by said complex PSK modulated signal (x(k)) to calculate said forward phase offset.

31. A phase error corrector of claim 30, wherein said delay means (4) delays said complex PSK modulated signal x(k)) by one symbol duration.

32. The phase error corrector of claim 30, said forward phase correction means further comprising an inverter (5) for inverting a quadrature component (Q) of said fist delayed signal thereby generating a conjugated first delayed signal (x*(k−1)) and providing said conjugated first delayed signal (x*(k−1)) to said complex multiplier (6).

33. The phase error corrector of claim 27, wherein a nPSK modulated signal is received at said input (1) and said forward phase correction means comprising a first modulo module (8) for receiving said forward phase offset for adding or subtracting $2\pi/n$ to or from said forward phase offset in order to generate a limited forward phase offset being within an interval ranging from $-\pi/n$ to $\pi/n$.

34. The phase error corrector of claim 27, said backward phase correction means comprising a second angle module (12) for calculating a backward phase offset based on said complex phase corrected signal comprising in-phase and quadrature component.

35. The phase error corrector of claim 34, wherein said second angle module (12) approximates an arctan function (y a linear function with a slope of 1.

36. The phase error corrector of claim 27, wherein said input (1) receives a complex nPSK modulated signal and said backward phase correction means comprising a second modulo module (16) for adding or subtracting $2\pi/n$ to or from said backward phase offset in order to generate a limited backward phase offset being within an interval ranging from $-\pi/n$ to $\pi/n$.

37. The phase error corrector of claim 27, said backward phase correction means comprising a second delay means (11) connected to an output of said mixer (3) for receiving said phase corrected signal and generating a delayed phase corrected signal; said backward phase offset being calculated based on said delayed phase corrected signal.

38. The phase error corrector of claim 27, further comprising a first low-pass filter (9) connected to said forward phase correction means (7, 8, 15) for low-pass filtering said forward phase offset and being connected to said subtractor (10) for providing its output to said subtractor (10).

39. The phase error corrector of claim 27, further comprising a first averaging filter (9) connected to said forward phase correction means (7, 8, 15) for averaging said forward phase offset, said averaging filter (9) being connected to said subtractor (10) for providing said averaged forward phase offset to said subtractor (10).

40. The phase error corrector of claim 27, further comprising a second low-pass filter (13) connected to said backward phase correction means (11, 12, 16) for low-pass filtering said backward phase offset for generating a low-pass filtered backward phase offset; said second low-pass filter (13) being connected to said subtractor for providing said low-pass filter backward phase offset to said subtractor (10).

41. The phase error corrector of claim 27, further comprising a second averaging filter (13) connected to said backward phase correction means (11, 12, 16) for averaging said backward phase offset for generating an averaged backward phase offset; said averaging filter (13) being connected to said subtractor for providing said averaged backward phase offset to said subtractor (10).

42. A phase error correction method comprising:
calculating a forward phase offset of a complex PSK modulated signal (x(k));
calculating a backward phase offset based on a phase corrected signal;
subtracting said forward phase offset from said backward phase offset thereby calculating a difference phase offset;
shifting (3) the phase of said complex PSK modulated signal (x(k)) approximately by said difference phase offset thereby generating said phase corrected signal; and
low-pass filtering said forward phase offset thereby generating a low-pass filtered forward phase offset from said backward phase offset in order to-calculate said difference phase offset.

43. The method of claim 42, further comprising calculating said forward phase offset based on a complex forward phase correction signal which comprises an in-phase and a quadrature component, wherein the forward phase offset constitutes the phase of said complex forward phase correction signal.

44. The method of claim 43, wherein an arctan function for calculating the phase of said forward phase correction signal being approximated by a linear function with a slope of 1.

45. The method of claim 42, further comprising delaying said complex PSK modulated signal (x(k)) thereby generating a first delayed signal (x(k−1));
and multiplying said first delayed signal (x(k−1) by said complex PSK modulated signal (x(k)) to calculate said complex forward phase offset.

46. The method of claim 45, wherein said first delayed signal is delayed by one symbol duration with respect to said complex PSK modulated signal (x(k)).

47. The method of claim 45, further comprising inverting a quadrature component (Q) of said first delayed signal (x(k−1) thereby generating a conjugated first delayed signal (x*(k−1)) and multiplying said conjugated first delayed signal by said complex PSK modulated signal (x(k)) to calculate said forward phase offset.

48. The method of claim 42, wherein said complex PSK modulated signal (x(k)) is a complex nPSK modulated signal; the method further comprising adding or subtracting $2\pi/n$ to or from said forward phase offset in order to generate a limited forward phase offset being within an interval ranging from $-\pi/n$ to $\pi/n$.

49. The method of claim 42, further comprising calculating a backward phase offset based on said complex phase corrected signal comprising an in-phase and quadrature component; said backward phase offset constituting the phase offset complex phase corrected signal.

50. The method of claim 49, wherein an arctan function for calculating the phase of said complex phase corrected signal is approximated by a linear function with a slope of 1.

51. The method of claim 42, wherein said complex PSK modulated signal (x(k)) is a complex nPSK modulated signal and said method further comprising adding or subtracting $2\pi/n$ to or from said backward phase offset thereby calculating a limited backward phase offset being within an interval ranging from $-\pi/n$ to $\pi/n$.

52. The method of claim 42, further comprising delaying (11) said phase corrected signal and thereby generating a delayed phase corrected signal; and calculating said backward phase offset based on said delayed phase corrected signal.

53. The method of claim 42, further comprising averaging said forward phase offset thereby generating an average forward phase offset and subtracting said average forward phase offset from said backward phase offset thereby calculating a difference phase offset.

54. The method of claim 42, further comprising low-pass filtering said backward phase offset in order to generate a low-pass filtered backward phase offset and subtracting said forward phase offset from said low-pass filtered backward offset thereby calculating said difference phase offset.

55. The method of claim 42, further comprising averaging said backward phase offset for generating an averaged backward phase offset and subtracting said forward phase offset from said averaged backward phase offset thereby calculating said phase difference offset.

56. The method of claim 42, the shifting of the phase of said complex PSK modulated signal being performed by multiplying said complex PSK modulated signal by a complex phase correction signal comprising an in-phase component and a quadrature component wherein the phase of said phase correction signal being equivalent to said difference phase offset.

* * * * *